(12) United States Patent
Nonoyama et al.

(10) Patent No.: US 10,770,737 B2
(45) Date of Patent: Sep. 8, 2020

(54) GASKET AND FUEL CELL STACK INCLUDING GASKET

(71) Applicant: TOYOTA JIDOSHA KABUSHIKI KAISHA, Toyota-shi, Aichi-ken (JP)

(72) Inventors: Nobuaki Nonoyama, Chiryu (JP); Kenji Sato, Kasugai (JP); Hideya Kadono, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 264 days.

(21) Appl. No.: 15/948,165

(22) Filed: Apr. 9, 2018

(65) Prior Publication Data
US 2018/0301717 A1 Oct. 18, 2018

(30) Foreign Application Priority Data

Apr. 13, 2017 (JP) .................................. 2017-079527

(51) Int. Cl.
*H01M 8/0273* (2016.01)
*H01M 8/242* (2016.01)
*H01M 8/1018* (2016.01)
*H01M 8/0276* (2016.01)

(52) U.S. Cl.
CPC ....... *H01M 8/0273* (2013.01); *H01M 8/0276* (2013.01); *H01M 8/1018* (2013.01); *H01M 8/242* (2013.01); *H01M 2008/1095* (2013.01)

(58) Field of Classification Search
None
See application file for complete search history.

(56) References Cited

U.S. PATENT DOCUMENTS

| 2007/0003821 | A1* | 1/2007 | Belchuk | H01M 8/0273 429/465 |
| 2009/0029231 | A1* | 1/2009 | Hood | F16J 15/104 429/483 |
| 2009/0286136 | A1* | 11/2009 | Yamamoto | H01M 8/0247 429/434 |
| 2012/0107718 | A1* | 5/2012 | Masaka | H01M 8/0202 429/482 |
| 2015/0349355 | A1* | 12/2015 | Goto | H01M 8/2457 429/482 |
| 2016/0111735 | A1 | 4/2016 | Shimazoe et al. | |

FOREIGN PATENT DOCUMENTS

| JP | 2006-004851 | 1/2006 |
| JP | 2014-229584 | 12/2014 |

* cited by examiner

*Primary Examiner* — Tracy M Dove
(74) *Attorney, Agent, or Firm* — Finnegan, Henderson, Farabow, Garrett & Dunner, LLP

(57) ABSTRACT

A gasket comprising: a first sealing part surrounding the sealed area; and a second sealing part surrounding the sealed area and being provided external to an area surrounded by the first sealing part. When a compressive deformation ratio is defined as a ratio of a deformation amount in a height direction to pressure applied to the gasket in the height direction, in the first sealing part, the compressive deformation ratio at a section to be arranged on a first fuel cell side is greater than the compressive deformation ratio at a section to be arranged on a second fuel cell side, and in the second sealing part, the compressive deformation ratio at a section to be arranged on the second fuel cell side is greater than the compressive deformation ratio at a section to be arranged on the first fuel cell side.

9 Claims, 13 Drawing Sheets

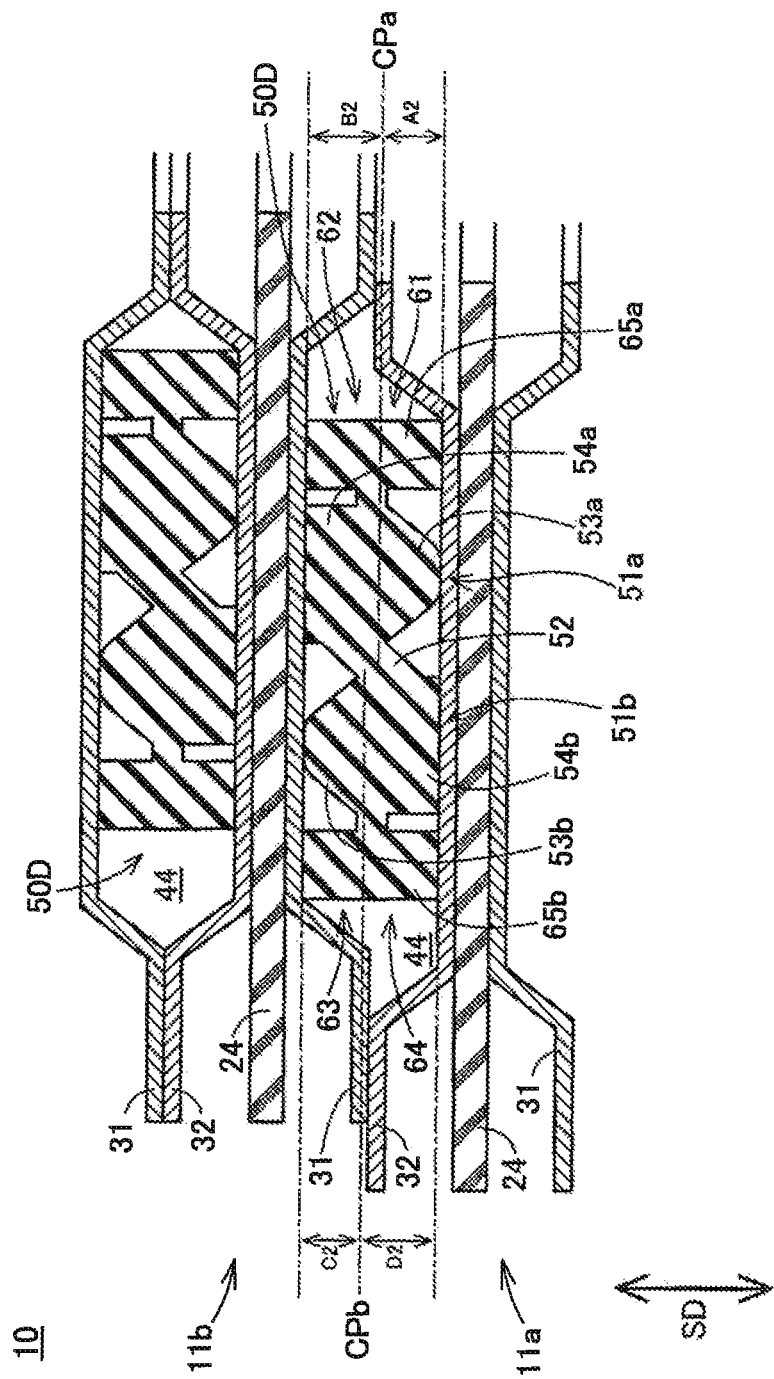

GASKET AND FUEL CELL STACK INCLUDING GASKET

The present application claims the priority based on Japanese Patent Application No. 2017-079527 filed on Apr. 13, 2017, the disclosure of which is hereby incorporated by reference in its entirety.

BACKGROUND

Field

The present disclosure relates to a gasket and a fuel cell stack including the gasket.

Related Art

A polymer electrolyte fuel cell (hereinafter also called a "fuel cell" simply) can be configured as a fuel cell stack with multiple stacked fuel cells each having a membrane electrode assembly functioning as a power generator. The fuel cell stack is generally provided with a gasket between fuel cells adjacent to each other in a stacking direction. The gasket is to form a seal line for preventing leakage of a fluid such as reactive gas or a cooling medium supplied to the inside of the fuel cell stack (for example, see patent literatures JP2006-004851A and JP2014-229584A). Such a gasket is generally made of a resin material and abuts on the fuel cell to be compressed in a height direction, thereby forming the seal line.

To make the gasket contact the fuel cell as a sealing target more tightly, it is desirable that the gasket be deformed by compression to a large amount in the height direction when the gasket is assembled into the fuel cell stack. However, increasing the height of the gasket for the purpose of ensuring a certain amount of deformation by compression of the gasket makes it likely that internal distortion will tend to occur in the gasket during compression, thereby causing risk of reduced durability of the gasket. Meanwhile, deforming the gasket by compression to a small amount causes risk of reduction in sealing performance by the gasket. Referring to a gasket 1 described in JP2006-004851A mentioned above, for example, a sub-lip 7 is to be deformed by compression to a smaller amount than a main lip 5. This may unfortunately cause a situation where sealing performance by the sub-lip 7 becomes lower than that by the main lip 5. As described above, the gasket still has room for improvement in terms of reducing the occurrence of internal distortion and increasing durability while increasing sealing performance. These problems are not only faced by the gasket used in the fuel cell but are also common to a gasket to be compressed in a height direction to seal a sealed area.

SUMMARY

According to one aspect of the present disclosure, a gasket being caught between a first fuel cell and a second fuel cell of multiple stacked fuel cells included in a fuel cell stack is provided. The gasket being compressed in a height direction to seal a sealed area in the fuel cell stack. The gasket of this aspect comprises: a first sealing part surrounding the sealed area; and a second sealing part surrounding the sealed area and being provided external to an area surrounded by the first sealing part. When a compressive deformation ratio is defined as a ratio of a deformation amount in the height direction to pressure applied to the gasket in the height direction; in the first sealing part, the compressive deformation ratio at a section to be arranged on the first fuel cell side is greater than the compressive deformation ratio at a section to be arranged on the second fuel cell side; and in the second sealing part, the compressive deformation ratio at a section to be arranged on the second fuel cell side is greater than the compressive deformation ratio at a section to be arranged on the first fuel cell side.

BRIEF DESCRIPTION OF DRAWINGS

FIG. 7B is a schematic sectional view showing the state of the gasket of the fourth embodiment after the gasket is compressed;

DETAILED DESCRIPTION

1. First Embodiment

Figure 1:
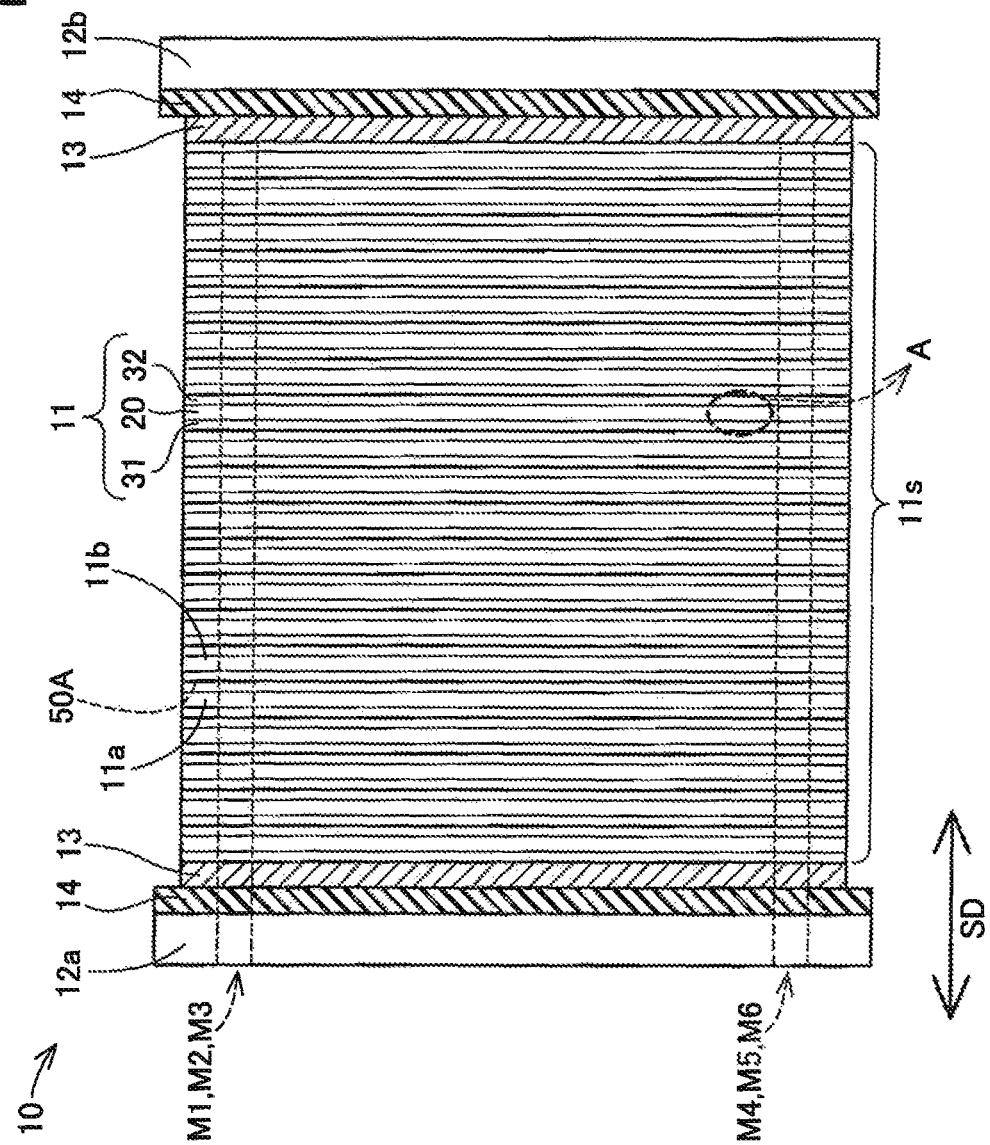
FIG. 1 is a schematic view showing the configuration of a fuel cell stack.

FIG. 1 is a schematic view showing the configuration of a fuel cell stack 10 including a gasket 50A of a first embodiment. The fuel cell stack 10 is a polymer electrolyte fuel cell that generates power by causing electrochemical reaction between hydrogen as fuel gas and oxygen as oxidizing gas. The fuel cell stack 10 is constructed by fastening the stacked multiple fuel cells 11. FIG. 1 shows an arrow indicating a stacking direction SD in which the fuel cells 11 are stacked in the fuel cell stack 10.

The fuel cell 11 is also called a unit cell. The fuel cell 11 is a component capable of generating power alone. The fuel cell 11 includes a membrane electrode assembly 20 as a power generator and two separators 31 and 32. In the fuel cell 11, the membrane electrode assembly 20 is caught between the two separators 31 and 32 in the stacking direction SD. The membrane electrode assembly 20 and the separators 31 and 32 will be described in detail later.

In the description below, any two of the fuel cells 11 forming the fuel cell stack 10 and adjacent to each other in the stacking direction SD are also called a "first fuel cell 11a" and a "second fuel cell 11b." The gasket 50A is arranged between the first fuel cell 11a and the second fuel cell 11b. The gasket 50A is arranged inside the fuel cell stack 10. Thus, in FIG. 1, the leader line for the sign of the gasket 50A is illustrated as a dashed line.

The gasket 50A is caught between the first fuel cell 11a and the second fuel cell 11b in a compressed state. The gasket 50A functions to prevent leakage of a fluid supplied as reactive gas to the fuel cell stack 10. Examples of the fluid to be supplied to the fuel cell stack 10 include reactive gas including fuel gas and oxidizing gas, and a cooling medium used for controlling an operating temperature of the fuel cell stack 10. The arrangement and the configuration of the gasket 50A will be described in detail later.

In the fuel cell stack 10, a stacked body 11s including the fuel cells 11 is caught in the stacking direction SD by two ends plates 12a and 12b. A current collecting plate 13 and an insulating plate 14 are arranged between each of the end plates 12a and 12b and the stacked body 11s. Each of the end plates 12a and 12b is formed of a metal plate, for example. The stacked body 11s receives fastening force applied from a fastening member (not shown in the drawings) and acting in the stacking direction SD through the first end plate 12a and the second end plate 12b.

The current collecting plate 13 is formed of a plate-like member having conductivity. The current collecting plate 13 contacts the stacked body 11s and is electrically continuous with each fuel cell 11. Power generated by the fuel cell stack 10 is output to the outside through the current collecting plate 13. The insulating plate 14 is arranged between the current collecting plate 13 and each of the end plates 12a and 12b for insulation therebetween.

The fuel cell stack 10 is provided with a manifold M1, a manifold M2, a manifold M3, a manifold M4, a manifold M5, and a manifold M6 (indicated by dashed lines) functioning as flow paths for the reactive gas and the cooling medium. Each of the manifolds M1 to M6 is formed by connecting through holes formed in corresponding fuel cells 11 in the stacking direction SD. The manifolds M1 to M3 on a supply side and the manifolds M4 to M6 on a discharge side are aligned at opposite end portions of each fuel cell 11 so as to catch a power generation area (described later) between the manifolds M1 to M3 and the manifolds M4 to M6. In FIG. 1, the manifolds M1 to M3 on the supply side are shown to overlap each other, and the manifolds M4 to M6 on the discharge side are shown to overlap each other.

The first manifold M1 functions as a gas flow path for supply of the fuel gas to an anode of each fuel cell 11. The second manifold M2 functions as a gas flow path for supply of the oxidizing gas to a cathode of each fuel cell 11. The third manifold M3 functions as a flow path for supply of the cooling medium to a cooling medium flow path (described later) formed between the first fuel cell 11a and the second fuel cell 11b. The fourth manifold M4 functions as a flow path for discharged gas discharged from the anode of each fuel cell 11. The fifth manifold M5 functions as a flow path for discharged gas discharged from the cathode of each fuel cell 11. The sixth manifold M6 functions as a discharge flow path for the cooling medium connected to the above-described cooling medium flow path.

Each of the first end plate 12a, and the current collecting plate 13 and the insulating plate 14 closer to the first end plate 12a is provided with a through hole forming an end portion of each of the manifolds M1 to M6. The first end plate 12a is provided with a connection for connecting pipes for the reactive gas and the cooling medium to corresponding ones of the manifolds M1 to M6 (this connection will not be described in detail).

Figure 2:
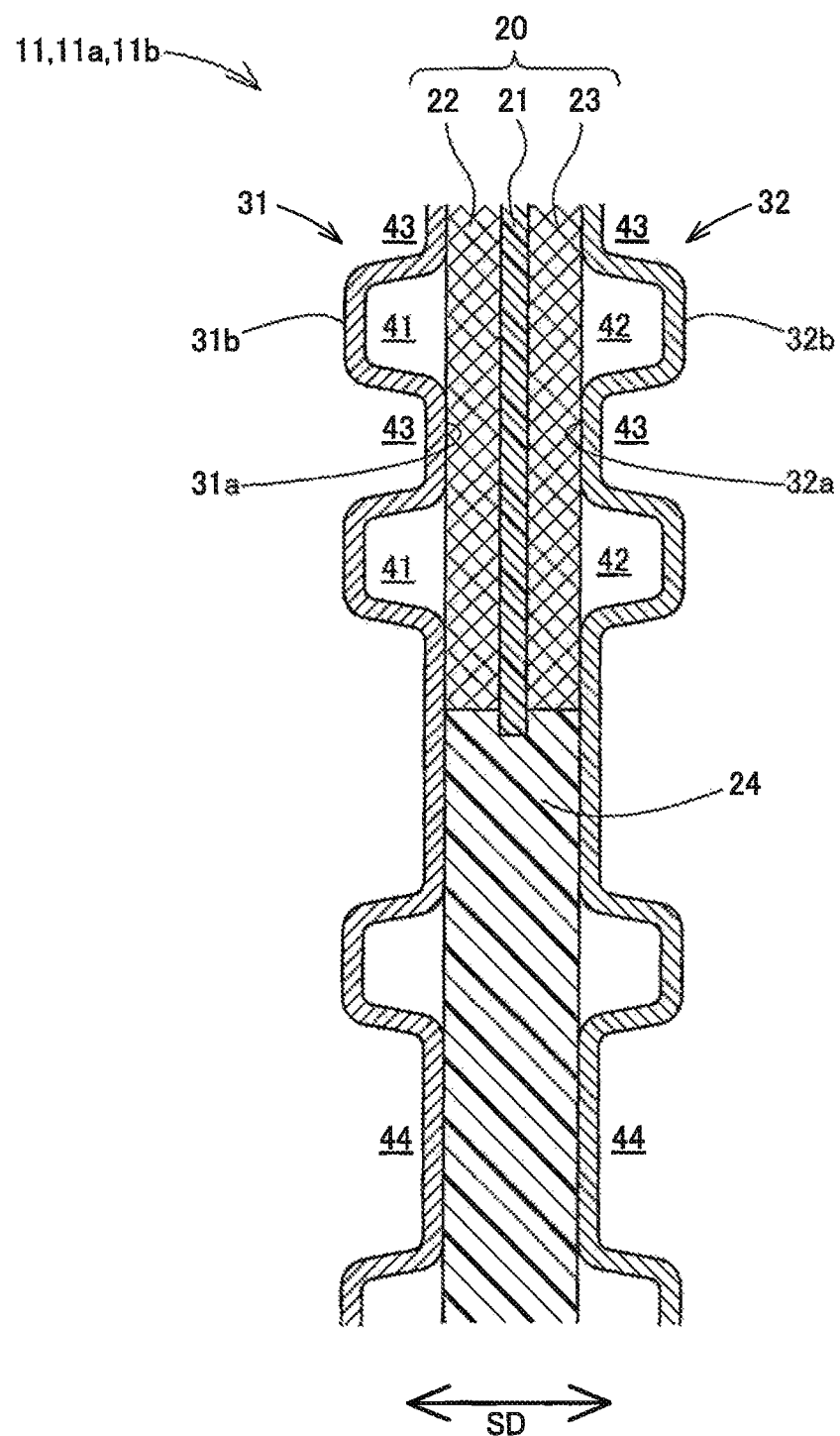
FIG. 2 is a schematic view for explaining the configuration of a fuel cell.

FIG. 2 is a schematic view for explaining the configuration of the fuel cell 11. The configuration in cross section shown as an example in FIG. 2 corresponds to a part of the fuel cell 11 within an area A surrounded by a dashed line in FIG. 1. The membrane electrode assembly 20 includes an electrolyte membrane 21, and two electrodes 22 and 23.

The electrolyte membrane 21 is a membrane made of electrolyte resin exhibiting favorable proton conductivity in a wet condition. The electrolyte membrane 21 is made of fluorine-based ion-exchange resin, for example. The first electrode 22 and the second electrode 23 are arranged on opposite surfaces of the electrolyte membrane 21. In this embodiment, the first electrode 22 is an anode to be fed with the fuel gas, and the second electrode 23 is a cathode to be fed with the oxidizing gas. Each of the electrodes 22 and 23 is made of a conductive material having gas diffusion properties and including supported catalyst particles for promoting power generation reaction. An area in which the electrodes 22 and 23 are arranged substantially corresponds to a power generation area where power generation reaction is generated in each fuel cell 11.

In this embodiment, the membrane electrode assembly 20 is integrated with a frame member 24 surrounding the outer periphery of the membrane electrode assembly 20. The frame member 24 is made of a resin material having air tightness and insulating properties. The manifolds M1 to M6 described above (shown in FIG. 1) are provided in each fuel cell 11 so as to penetrate the frame member 24.

Each of the separators 31 and 32 covers the membrane electrode assembly 20 and the frame member 24 entirely. In this embodiment, the first separator 31 is an anode separator facing the first electrode 22 as an anode. The second separator 32 is a cathode separator facing the second electrode 23 as a cathode.

Each of the separators 31 and 32 is formed of a plate-like member having conductivity and gas impermeability. In this embodiment, each of the separators 31 and 32 is a metal separator and is formed of a pressed plate resulting from press forming of a member made of metal such as stainless steel or titanium. Each of the separators 31 and 32 is not always required to be formed as a metal separator. Each of the separators 31 and 32 may be formed of a member resulting from forming of carbon into a plate-like shape.

The separators 31 and 32 are provided with a groove 41 and a groove 42 respectively for forming flow paths for the corresponding reactive gases. Each of the separators 31 and 32 is further provided with a groove 43 for forming a flow path for the cooling medium, and a groove 44 for forming space for arrangement of the gasket 50A. In this embodiment, the grooves 41 to 44 are formed by bending the separators 31 and 32 by press working so as to form recesses and projections in the separators 31 and 32 in their thickness directions. The grooves 41 to 44 may also be formed by groove cutting by means of etching instead of press work.

The groove 41 includes multiple parallel grooves 41 for flow of the fuel gas formed on a first surface 31a of the first separator 31 facing the first electrode 22 and arranged in the power generation area. The groove 43 includes multiple parallel grooves 43 for flow of the cooling medium formed on a second surface 31b of the first separator 31 to be arranged in the power generation area. The groove 44 for forming the space for arrangement of the gasket 50A is further formed on the second surface 31b of the first separator 31 to be arranged outside the power generation area. Specific examples of the areas for forming the grooves 41, 43, and 44 will be described later.

The groove 42 includes multiple parallel grooves 42 for flow of the oxidizing gas formed on a first surface 32a of the second separator 32 facing the second electrode 23 and arranged to cover the power generation area entirely. The multiple parallel grooves 43 for flow of the cooling medium are formed on a second surface 32b of the second separator 32 and arranged in the power generation area. The groove 44 for forming the space for arrangement of the gasket 50A is further formed on the second surface 32b of the second separator 32 to be arranged outside the power generation area.

The respective grooves 43 for the cooling medium of the separators 31 and 32 are formed at corresponding positions so as to face each other in the stacking direction SD. Further, the respective grooves 44 for the gasket 50A of the separators 31 and 32 are formed at corresponding positions so as to face each other in the stacking direction SD. In the fuel cell stack 10, the respective grooves 43 of the separators 31 and 32 face each other to form a tubular cooling medium flow path between adjacent ones of the fuel cells 11. Further, the respective grooves 44 of the separators 31 and 32 face each other to form tubular space for housing of the gasket 50A between adjacent ones of the fuel cells 11.

Figure 3:
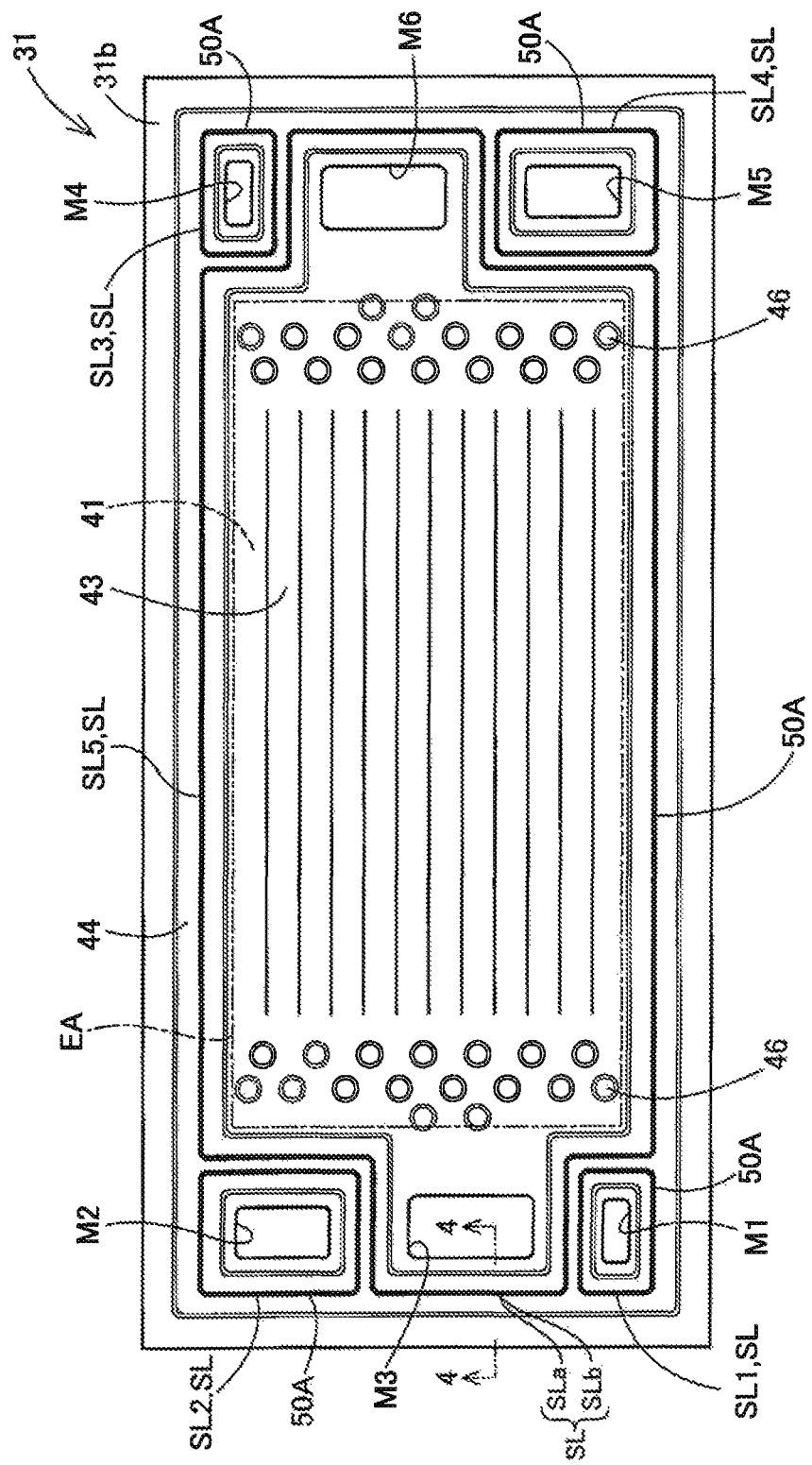
FIG. 3 is a schematic view showing the configuration of a second surface of a first separator.

Referring to FIG. 3, an example of the area for arrangement of the gasket 50A in each fuel cell 11 and examples of the areas for forming the above-described grooves 41 to 44 will be described below. FIG. 3 is a schematic view showing the configuration of the second surface 31b of the first separator 31. FIG. 3 shows the gasket 50A arranged on the second surface 31b of the first separator 31 in the fuel cell stack 10. FIG. 3 further shows a power generation area EA in the fuel cell 11 indicated by alternate long and short dashed lines. The second separator 32 has a configuration corresponding to that of the first separator 31 described below, so the configuration of the second separator 32 will not be described in detail.

The power generation area EA in the fuel cell 11 is located between a line of the manifolds M1 to M3 on the supply side and a line of the manifolds M4 to M6 on the discharge side. In this embodiment, the manifolds M1 and M4 for the fuel gas are provided at diagonally opposite corners across the power generation area BA. The manifolds M2 and M5 for the oxidizing gas are formed at corners opposite the corners where the corresponding ones of the manifolds M1 and M4 for the fuel gas are arranged. The manifold M3 for supply of the cooling medium is arranged between the manifolds M1 and M2 for supply of the reactive gases. The manifold M6 for discharge of the cooling medium is arranged between the manifolds M4 and M5 for discharge of the reactive gases. This is not the only arrangement of the manifolds M1 to M6 but the arrangement of the manifolds M1 to M6 may be changed, where appropriate.

The gasket 50A is configured as an annular member surrounding a sealed area. The gasket 50A is formed by injection molding of a resin material such as rubber or thermoplastic elastomer, for example. In this embodiment, the gasket 50A is arranged to surround each of the manifolds M1, M2, M4, and M5 for the reactive gases. The gasket 50A is also formed to surround the manifolds M3 and M6 for the cooling medium and the power generation area EA.

The gasket 50A surrounding the first manifold M1 forms a first seal line SL1 for preventing leakage of the fuel gas. The gasket 50A surrounding the second manifold M2 forms a second seal line SL2 for preventing leakage of the oxidizing gas. The gasket 50A surrounding the fourth manifold M4 forms a third seal line SL3 for preventing leakage of anode-side discharged gas. The gasket 50A surrounding the fifth manifold M5 forms a fourth seal line SL4 for preventing leakage of cathode-side discharged gas. The gasket 50A surrounding the manifolds M3 and M6 for the cooling medium and the power generation area EA forms a fifth seal line SL5 for preventing leakage of the cooling medium. In the below, where distinction between the seal lines SL1 to SL5 is not required for any particular purpose, the seal lines SL1 to SL5 are collectively called a "seal line SL." The seal line means a boundary between the sealed area where a fluid is to be sealed and an area outside the sealed area.

The groove 44 for arrangement of the gasket 50A is formed so as to correspond to the above-described area for arrangement of the gasket 50A. In this embodiment, where the gaskets 50A are arranged parallel to each other, an area including these gaskets 50A is housed in one groove 44.

The grooves 41 and 43 for forming flow paths for the corresponding fluids will be described. In this embodiment, the groove 43 for the cooling medium forms a group of multiple parallel grooves extending linearly in the power generation area BA in a direction from the supply side to the discharge side. As described above by referring to FIG. 2, the groove 41 for the fuel gas is formed on the first surface 31a on the opposite side to the groove 43 for the cooling medium so as to correspond to the groove 43. The groove 41 is not viewable in FIG. 3. Thus, in FIG. 3, the position of the groove 41 is indicated by a dashed leader line. In this embodiment, multiple tiny projections 46 also called dimples are arranged in a distributed fashion on the upstream side and the downstream side of the groove 43 in the power generation area EA. The projections 46 function to distribute a flow of the cooling medium. The projections 46 are omissible.

Figure 4A:
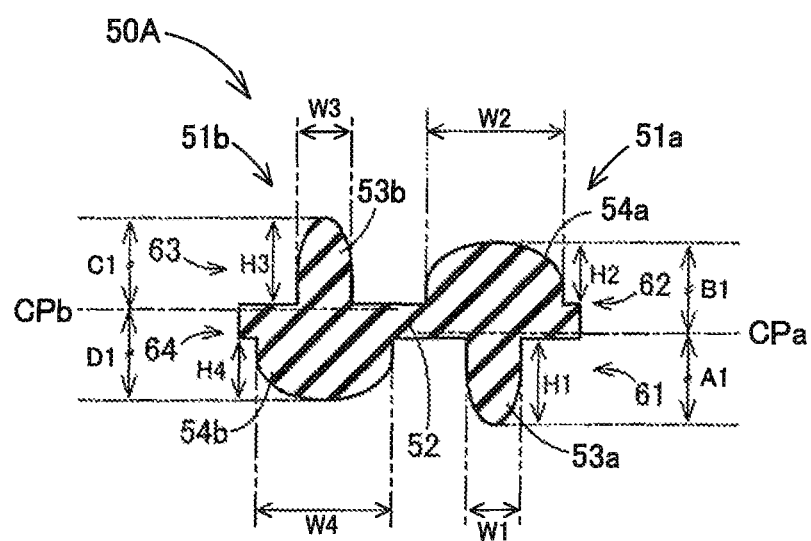
FIG. 4A is a schematic sectional view showing the state of a gasket of a first embodiment before the gasket is compressed.
Figure 4B:
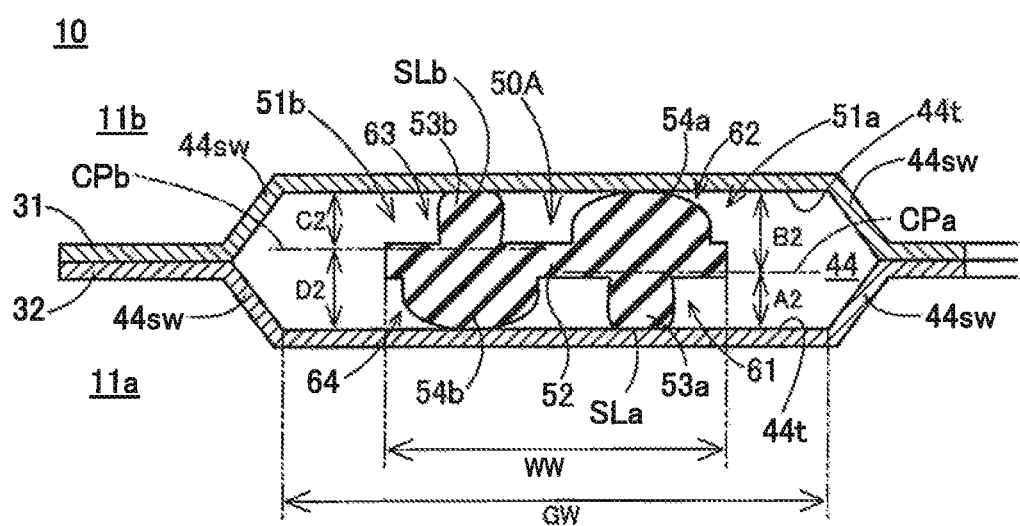
FIG. 4B is a schematic sectional view showing the state of the gasket of the first embodiment after the gasket is compressed.

The configuration of the gasket 50A of this embodiment will be described by referring to FIGS. 4A and 4B. FIG. 4A is a schematic sectional view showing the gasket 50A in a state before the gasket 50A is compressed. FIG. 4B is a schematic sectional view showing the gasket 50A in a state after the gasket 50A is compressed. For the convenience of illustration, FIG. 4B shows the second separator 32 of the first fuel cell 11a and the first separator 31 of the second fuel cell 11b. The cutting plane illustrated in each of FIGS. 4A and 4B is vertical to the seal line SL formed by the gasket 50A in the fuel cell stack 10. The cutting plane shown in each of FIGS. 4A and 4B corresponds to a cutting plane cut from 4-4 of FIG. 3, for example.

The gasket 50A is caught between the second separator 32 of the first fuel cell 11a and the first separator 31 of the second fuel cell 11b to be compressed in the height direction of the gasket 50A (as shown in FIGS. 4A and 4B). In this embodiment, the gasket 50A is arranged in a state of being connected non-adhesively to the first fuel cell 11a and the second fuel cell 11b. The "arrangement in a state of being connected non-adhesively" mentioned in this specification means that the gasket 50A is arranged while not being connected adhesively with an adhesive agent or adhesive means such as welding or fusion bonding. Thus, if the gasket 50A is connected by means of the adhesion of a material itself forming the gasket 50A, this state is a part of the "state of being connected non-adhesively."

The gasket 50A includes a first sealing part 51a, a second sealing part 51b, and a connecting part 52. The first sealing part 51a is configured to surround a sealed area to be sealed by the gasket 50A. The second sealing part 51b is configured to surround the sealed area and to be provided external to an area surrounded by the first sealing part 51a. The connecting part 52 connects the first sealing part 51a and the second sealing part 51b. In this embodiment, the connecting part 52 is provided in a center part of the gasket 50A in the height direction to extend between the first sealing part 51a and the second sealing part 51b. In this embodiment, the gasket 50A is entirely made of the same kind of resin material.

The first sealing part 51a includes a first lip portion 53a and a first base portion 54a (as shown in FIG. 4A). When the gasket 50A is assembled into the fuel cell stack 10, the first lip portion 53a is arranged on the first fuel cell 11a side, and the first base portion 54a is arranged on the second fuel cell 11b side (as shown in FIG. 4B). In the following description about the first sealing part 51a, "upward" means a direction toward the first lip portion 53a in the height direction, and "downward" means a direction toward the first base portion 54a in the height direction. This also applies to other embodiments and modifications described later.

The first lip portion 53a protrudes upwardly in the height direction of the gasket 50A (as shown in FIG. 4A). When the gasket 50A is assembled into the fuel cell stack 10, the first lip portion 53a abuts on the second separator 32 of the first fuel cell 11a to form a seal line SLa (as shown in FIG. 4B).

The first base portion 54a is located downwardly from the first lip portion 53a. The first base portion 54a abuts on the first separator 31 of the second fuel cell 11b to support the first lip portion 53a (as shown in FIG. 4B). In this embodiment, the first base portion 54a is formed as a protruded portion having a cross section of a substantially semispherical shape protruding downwardly in the cutting plane of FIG. 4A.

In this embodiment, in the cutting plane of FIG. 4A, the first lip portion 53a has a maximum width W1 smaller than a maximum width W2 of the first base portion 54a. This makes the first lip portion 53a form a wall portion around the sealed area in the fuel cell stack 10 narrower than a wall portion formed by the first base portion 54a (as shown in FIG. 4B).

In this embodiment, while the gasket 50A is not compressed, the first lip portion 53a has a height H1 greater than a height H2 of the first base portion 54a (as shown in FIG. 4A). The first lip portion 53a protrudes in an elongated shape in the cutting plane of FIG. 4A. The first base portion 54a is configured as a protruded portion flatter than the first lip portion 53a. The ratio of the height H1 to the maximum width W1 of the first lip portion 53a is higher than the ratio of the height H2 to the maximum width W2 of the first base portion 54a (as shown in FIG. 4A). With this shape, when the gasket 50A is assembled into the fuel cell stack 10 and compressed, amount of compressive deformation of the first lip portion 53a in the height direction is greater than amount of compressive deformation of the first base portion 54a in the height direction.

Like the first sealing part 51a, the second sealing part 51b includes a second lip portion 53b and a second base portion 54b (as shown in FIG. 4A). When the gasket 50A is assembled into the fuel cell stack 10, the second lip portion 53b is arranged on the second fuel cell 11b side, and the second base portion 54b is arranged on the first fuel cell 11a side (as shown in FIG. 4B).

The second sealing part 51b has a configuration formed by flipping the first sealing part 51a from top to bottom in the height direction. In the following description about the second sealing part 51b, "upward" means a direction toward the second lip portion 53b in the height direction, and "downward" means a direction toward the second base portion 54b in the height direction. This also applies to other embodiments and modifications described later.

The second lip portion 53b protrudes upwardly in the height direction of the gasket 50A (as shown in FIG. 4A). When the gasket 50A is assembled into the fuel cell stack 10, the second lip portion 53b abuts on the first separator 31 of the second fuel cell 11b to form a seal line SLb (as shown in FIG. 4B).

The second base portion 54b is located downwardly from the second lip portion 53b. The second base portion 54b abuts on the second separator 32 of the first fuel cell 11a to support the second lip portion 53b (as shown in FIG. 4B). In this embodiment, the second base portion 54b is formed as a protruded portion having a cross section of a substantially semispherical shape protruding downwardly in the cutting plane of FIG. 4A.

In this embodiment, in the cutting plane of FIG. 4A, the second lip portion 53b has a maximum width W3 smaller than a maximum width W4 of the second base portion 54b. This makes the second lip portion 53b form a wall portion around the sealed area in the fuel cell stack 10 narrower than a wall portion formed by the second base portion 54b (as shown in FIG. 4B).

While the gasket 50A is not compressed, the second lip portion 53b has a height H3 greater than a height H4 of the second base portion 54b. The second lip portion 53b protrudes in an elongated shape in the cutting plane of FIG. 4A. The second base portion 54b is configured as a protruded portion flatter than the second lip portion 53b. The ratio of the height H3 to the maximum width W3 of the second lip portion 53b is higher than the ratio of the height H4 to the maximum width W4 of the second base portion 54b (as shown in FIG. 4A). With this shape, when the gasket 50A is assembled into the fuel cell stack 10 and compressed, amount of compressive deformation of the second lip portion 53b in the height direction is greater than amount of compressive deformation of the second base portion 54b in the height direction.

Refer to FIG. 4A. The center position of the first sealing part 51a in the height direction determined when the gasket 50A is not compressed is called a "center CPa of the first sealing part 51a." The center position of the second sealing part 51b in the height direction determined when the gasket 50A is not compressed is called a "center CPb of the second sealing part 51b". Refer to FIG. 4B. In the gasket 50A after being assembled into the fuel cell stack 10 and compressed, the center CPa and the center CPb do not exist at the center of the first sealing part 51a in height direction and the center of the second sealing part 51b in the height direction respectively. In the gasket 50A after being compressed, the center CPa of the first sealing part 51a is moved to be closer to the first fuel cell 11a than the second fuel cell 11b. Likewise, in the gasket 50A, the center CPb of the second sealing part 51b is moved to be closer to the second fuel cell 11b than the first fuel cell 11a.

Refer to FIGS. 4A and 4B. In the first sealing part 51a, a section to be arranged on the first fuel cell 11a side and upward from the center CPa is called a "first sealing part upward section 61." Further, a section to be arranged on the second fuel cell 11b side and downward from the center CPa is called a "first sealing part downward section 62". Likewise, in the second sealing part 51b, a section to be arranged on the second fuel cell 11b side and upward from the center CPb is called a "second sealing part upward section 63." Further, a section to be arranged on the first fuel cell 11a side and downward from the center CPb is called a "second sealing part downward section 64." In the following description, the "upward sections 61 and 63" mean both the "first sealing part upward section 61" and the "second sealing part upward section 63." Likewise, the "downward sections 62 and 64" mean both the "first sealing part downward section 62" and the "second sealing part downward section 64."

Hereinafter, a ratio of the deformation amount in the height direction to pressure applied to the gasket in the height direction is defined as a "compressive deformation ratio in the height direction of the gasket." In the gasket 50A of this embodiment, the first lip portion 53a configured to be deformed easily by compression in the height direction makes up a major part of the first sealing part upward section 61. Further, the first base portion 54a configured to be less likely to be deformed by compression in the height direction makes up a major part of the first sealing part downward section 62. Thus, in the first sealing part 51a, a compressive deformation ratio in the height direction is higher at the first sealing part upward section 61 than at the first sealing part downward section 62. Likewise, the second lip portion 53b configured to be deformed easily in the height direction makes up a major part of the second sealing part upward section 63. Further, the second base portion 54b configured to be less likely to be deformed in the height direction makes up a major part of the second sealing part downward section 64. Thus, in the second sealing part 51b, a compressive deformation ratio in the height direction is higher at the second sealing part upward section 63 than at the second sealing part downward section 64.

Regarding the gasket 50A of this embodiment, relationships defined by the following inequalities (1) and (2) are established in a state before the gasket 50A is assembled into the fuel cell stack 10 and a state after the assembling:

$$A1-A2 > B1-B2 \quad (1)$$

$$C1-C2 > D1-D2 \quad (2)$$

A1: The height of the first sealing part upward section 61 before compression (as shown in FIG. 4A)
A2: The height of the first sealing part upward section 61 after compression (as shown in FIG. 4B)
B1: The height of the first sealing part downward section 62 before compression (as shown in FIG. 4A)
B2: The height of the first sealing part downward section 62 after compression (as shown in FIG. 4B)
C1: The height of the second sealing part upward section 63 before compression (as shown in FIG. 4A)
C2: The height of the second sealing part upward section 63 after compression (as shown in FIG. 4B)
D1: The height of the second sealing part downward section 64 before compression (as shown in FIG. 4A)
D2: The height of the second sealing part downward section 64 after compression (as shown in FIG. 4B)

The heights A1 and A2 of the first sealing part upward section 61 mean a distance from the center CPa of the first sealing part 51a to the upper end of the first lip portion 53a. The heights B1 and B2 of the first sealing part downward section 62 mean a distance from the center CPa of the first sealing part 51a to the lower end of the first base portion 54a. The heights C1 and C2 of the second sealing part upward section 63 mean a distance from the center CPb of the second sealing part 51b to the upper end of the second lip portion 53b. The heights D1 and D2 of the second sealing part downward section 64 mean a distance from the center CPb of the second sealing part 51b to the lower end of the second base portion 54b.

In the first sealing part 51a, as a result of the above-described difference in shape between the first lip portion 53a and the first base portion 54a, a compressive deformation ratio in the height direction at the first sealing part upward section 61 is greater than at the first sealing part downward section 62. Likewise, in the second sealing part 51b, as a result of the above-described difference in shape between the second lip portion 53b and the second base portion 54b, a compressive deformation ratio in the height direction at the second sealing part upward section 63 is greater than at the second sealing part downward section 64.

As described above, in the first sealing part 51a, the first lip portion 53a is deformed by compression in the height direction to a larger amount than the first base portion 54a during assembling into the fuel cell stack 10. Thus, in the first sealing part 51a, the first lip portion 53a contacts the first fuel cell 11a more tightly than the first base portion 54a contacting the second fuel cell 11b. In the first sealing part 51a, the seal line SLa (as shown in FIG. 4B) formed between the first lip portion 53a and the first fuel cell 11a realizes intended performance of sealing a fluid.

Likewise, in the second sealing part 51b, the second lip portion 53b is deformed in the height direction to a larger amount than the second base portion 54b during assembling into the fuel cell stack 10. Thus, in the second sealing part 51b, the second lip portion 53b contacts the second fuel cell 11b more tightly than the second base portion 54b contacting the first fuel cell 11a. In the second sealing part 51b, the seal line SLb (as shown in FIG. 4B) formed between the second lip portion 53b and the second fuel cell 11b realizes intended performance of sealing a fluid.

The seal line SL in the gasket 50A of this embodiment includes the seal line SLa closer to the first fuel cell 11a formed by the first sealing part 51a, and the seal line SLb closer to the second fuel cell 11b formed by the second sealing part 51b (as shown in FIG. 3). In this way, in the gasket 50A of this embodiment, sealing in a place closer to the first fuel cell 11a and sealing in a place closer to the second fuel cell 11b are achieved separately by the first sealing part 51a and the second sealing part 51b respectively. As a result, in the gasket 50A of this embodiment, sealing performance is increased at each of a surface closer to the first fuel cell 11a and a surface closer to the second fuel cell 11b.

In the gasket 50A of this embodiment, the first sealing part 51a includes the first sealing part downward section 62 lower in a compressive deformation ratio than the first sealing part upward section 61. Further, the second sealing part 51b includes the second sealing part downward section 64 lower in a compressive deformation ratio than the second sealing part upward section 63. This causes reduction in the amount of deformation by compression of the gasket 50A as a whole in the height direction when the gasket 50A is assembled into the fuel cell stack 10, while causing each of the upward sections 61 and 63 to be deformed by compression to a large amount during assembling into the fuel cell stack 10. In this way, in the gasket 50A, the occurrence of distortion in the gasket 50A as a whole is reduced, while sealing performance of the gasket 50A is increased at both surfaces of the first fuel cell 11a side and the second fuel cell 11b side. Further, durability of the gasket 50A is increased.

In the gasket 50A of this embodiment, the sealing parts 51a and 51b respectively include the narrow lip portions 53a and 53b each protruding upwardly and having a high compressive deformation ratio. This makes the sealing parts 51a and 51b more tightly contact the fuel cells 11a and 11b respectively. Further, the sealing parts 51a and 51b respectively include the base portions 54a and 54b wider than the lip portions 53a and 53b, and each having a flat shape and a low compressive deformation ratio. Thus, each of the sealing parts 51a and 51b is arranged in a more stable posture.

In the gasket 50A of this embodiment, the first sealing part 51a and the second sealing part 51b are connected by the connecting part 52. Therefore the first sealing part 51a and the second sealing part 51b support each other, the gasket 50A is arranged in a more stable posture. Further, the first sealing part 51a and the second sealing part 51b can be carried and assembled integrally, handling of the gasket 50A is more easily during steps of assembling the fuel cell stack 10.

In the gasket 50A, a compressive deformation ratio in the height direction at each of the sealing parts 51a and 51b is desirably adjusted in such a manner that an angle of arrangement of the connecting part 52 in the height direction is substantially unchanged between time before the gasket 50A is assembled into the fuel cell stack 10 and time after the assembling. By doing so, the occurrence of distortional stress in the connecting part 52 is reduced after the gasket 50A is assembled into the fuel cell stack 10.

As described above, when the gasket 50A of this embodiment is assembled into the fuel cell stack 10, the gasket 50A is housed in the space formed by the respective grooves 44 in the first fuel cell 11a and the second fuel cell 11b facing each other (as shown in FIG. 4B). In the cutting planes of FIGS. 4A and 4B, an entire width WW of the gasket 50A is set to be smaller than a width GW of a bottom surface 44t of the groove 44 in each of the fuel cells 11a and 11b. By doing so, the positioning of the gasket 50A is guided along a side wall 44sw of the groove 44 during the steps of assembling the fuel cell stack 10. Further, the occurrence of exposure of the gasket 50A to the outside is reduced in the fuel cell stack 10, thereby protecting the gasket 50A.

The gasket 50A of this embodiment is assembled into the fuel cell stack 10 in the state of being connected non-adhesively. This eliminates the need for executing a step such as prime coating or coating with an adhesive agent for adhesive connection of the gasket 50A and increases efficiency of manufacturing process of the fuel cell stack 10. This further facilitates work for exchange of the gasket 50A.

In the case where it is assumed that a lip portion having an elongated shape collapses when the gasket with the lip portion is assembled into a fuel cell stack, the height of the lip portion before being compressed is preferably lower. Even under this assumption, according to the gasket 50A of this embodiment, it is possible to increase deformation amount of each of the sealing parts 51a and 51b when the gasket 50A is assembled into the fuel cell stack 10, and to reduce height of the gasket 50A as a whole in the state that the gasket 50A is not compressed. Therefore, while sealing performance by the gasket 50A is increased, height of the gasket 50A in the state that the gasket 50A is not compressed is reduced, so that the probability of unintentional collapse of the lip portions 53a and 53b is reduced.

As described above, in the gasket 50A of this embodiment, the presence of the first sealing part 51a and the second sealing part 51b achieves increased sealing performance on the opposite sides of the gasket 50A in the height direction. Further, the amount of deformation by compression in the height direction is reduced in terms of the gasket 50A as a whole when the gasket 50A is assembled into the fuel cell stack 10. This causes reduction in the occurrence of stress resulting from distortion in the gasket 50A, thereby increasing the durability of the gasket 50A. The fuel cell stack 10 including the gasket 50A of this embodiment increases performance of sealing a fluid and reduces the probability of reduction in the sealing performance resulting from distortion in the gasket 50A. The gasket 50A of this embodiment is also achieved to reduce the height of the gasket 50A in a state of not being compressed while maintaining the sealing performance by the gasket 50A. This makes it possible to prevent collapse of the lip portions 53a and 53b while preventing reduction in the sealing performance by the gasket 50A in the fuel cell stack 10. Additionally, the gasket 50A and the fuel cell stack 10 of this embodiment achieve the various working effects described in this embodiment.

2. Second Embodiment

Figure 5A:
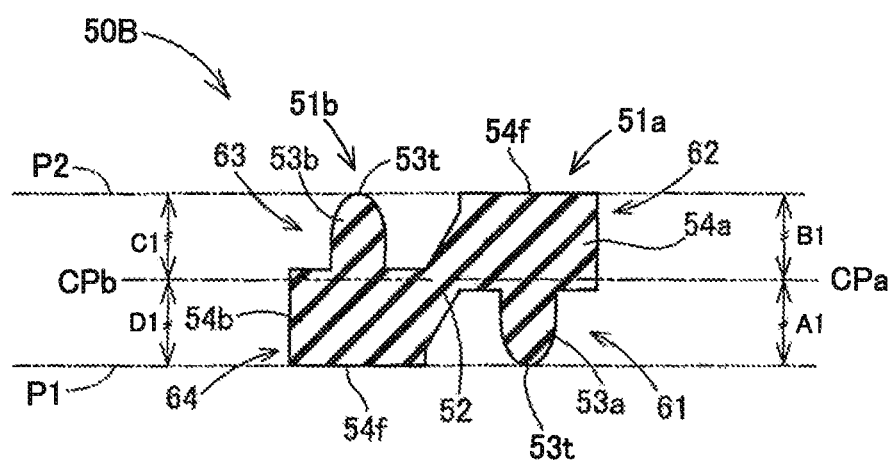
FIG. 5A is a schematic sectional view showing the state of a gasket of a second embodiment before the gasket is compressed.
Figure 5B:
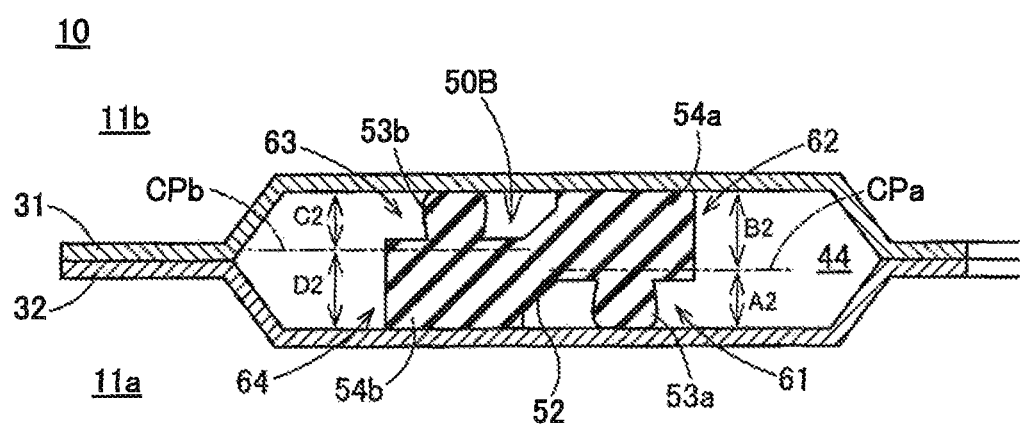
FIG. 5B is a schematic sectional view showing the state of the gasket of the second embodiment after the gasket is compressed.

Referring to FIGS. 5A and 5B, the configuration of a gasket 50B of a second embodiment will be described. FIG. 5A is a schematic sectional view showing the gasket 50B in a state before the gasket 50B is compressed. FIG. 5B is a schematic sectional view showing the gasket 50B in a state after the gasket 50B is compressed. The cutting planes of FIGS. 5A and 5B correspond to those shown in FIGS. 4A and 4B referred to in the description of the first embodiment. Like FIG. 4B, FIG. 5B shows the second separator 32 of the first fuel cell 11a and the first separator 31 of the second fuel cell 11b.

The gasket 50B of the second embodiment has a configuration similar to that of the gasket 50A of the first embodiment, except for the points described later. The gasket 50B is assembled into the fuel cell stack 10 described in the first embodiment (see in FIGS. 1 to 3). Like in the first embodiment, in the gasket 50B, compressive deformation ratios in the height direction at the upward sections 61 and 63 are greater than at the downward sections 62 and 64 of the sealing parts 51a and 51b. Further, the relationships defined by the inequalities (1) and (2) described in the first embodiment are established in a state before the gasket 50B is assembled into the fuel cell stack 10 and a state after the assembling.

In the gasket 50B of the second embodiment, each of the first base portion 54a and the second base portion 54b has a substantially flat bottom surface 54f substantially vertical to the height direction (as shown in FIG. 5A). "Being substantially flat" means a practically flat state that permits inclusion of unevenness or a curved surface within a tolerance range in the bottom surface 54f. Thus, each of the sealing parts 51a and 51b is arranged in a more stable posture. Each of the first base portion 54a and the second base portion 54b has a substantially rectangular cross section in the cutting plane of FIG. 5A. This reduces deformation of each of the base portions 54a and 54b in the height direction, compared to the case where each of the base portions 54a and 54b has a shape such as a substantially triangular shape producing a large difference between a maximum width and a minimum width in a direction vertical to the height direction. In this way, a compressive deformation ratio is reduced further at each of the base portions 54a and 54b.

In the gasket 50B, the first lip portion 53a protrudes from the upper surface of the first base portion 54a, and the second lip portion 53b protrudes from the upper surface of the second base portion 54b (as shown in FIG. 5A). The connecting part 52 connects respective sections of the first base portion 54a and the second base portion 54b closer to their upper surfaces diagonally to the height direction.

In the gasket 50B, when the gasket 50B is not compressed, a top 53t of the first lip portion 53a and the bottom surface 54f of the second base portion 54b are located at substantially the same height position on a first virtual plane P1 vertical to the height direction (as shown in FIG. 5A). Thus, by placing the gasket 50B on the first fuel cell 11a while pointing the first lip portion 53a and the second base portion 54b downwardly in the direction of gravitational force during steps of assembling the gasket SOB, the height direction of the gasket 50B and a direction in which the gasket 50B is compressed are allowed to agree with each other. This makes it unlikely that the gasket 50B will be assembled in a distorted state.

Likewise, in the gasket 50B, when the gasket 50B is not compressed, a top 53t of the second lip portion 53b and the bottom surface 54f of the first base portion 54a are located at substantially the same height position on a second virtual plane P2 vertical to the height direction (as shown in FIG. 5A). Thus, even if the gasket 50B is placed on the second fuel cell 11b while the second lip portion 53b and the first base portion 54a are pointed downwardly in the direction of gravitational force during the steps of assembling the gasket 50B, the height direction of the gasket 50B and the direction in which the gasket 50B is compressed are still allowed to agree with each other. This makes it unlikely that the gasket 50B will be assembled in a distorted state.

As described above, the gasket 50B has both a first configuration and a second configuration. In the first configuration, the top 53t of the first lip portion 53a and the bottom surface 54f of the second base portion 54b are located on the first virtual plane P1. In the second configuration, the top 53t of the second lip portion 53b and the bottom surface 54f of the first base portion 54a are located on the second virtual plane P2. With these configurations, the gasket 50B is allowed to receive pressure uniformly applied from the first fuel cell 11a and the second fuel cell 11b in the fuel cell stack 10. This reduces the occurrence of distortion in the gasket 50B in the fuel cell stack 10 to increase the durability of the gasket 50B. Additionally, during the steps of assembling the gasket 50B, making distinction between the top and the bottom in the height direction is not required for arrangement of the gasket 50B, thereby facilitating assembling of the gasket 50B.

As described above, the gasket 50B of the second embodiment achieves the various working effects described in the second embodiment including arrangement in a more stable posture and increased durability. Additionally, the gasket 50B of the second embodiment and the fuel cell stack 10 including the gasket 50B achieve various working effects comparable to those described in the first embodiment.

3. Third Embodiment

Figure 6A:
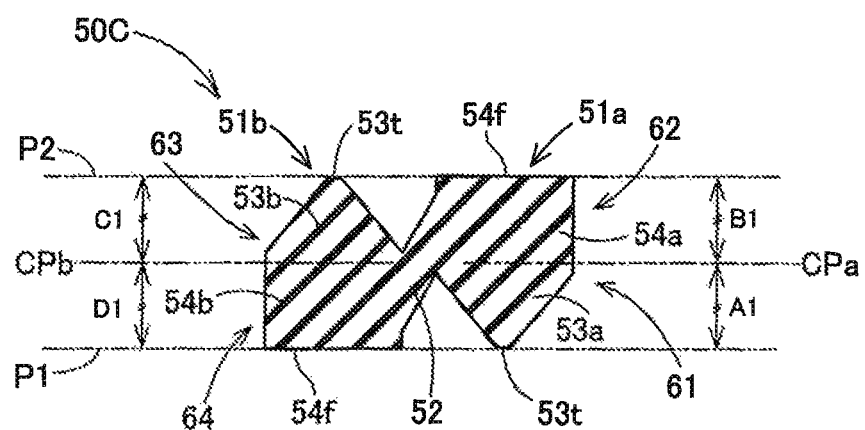
FIG. 6A is a schematic sectional view showing the state of a gasket of a third embodiment before the gasket is compressed.
Figure 6B:
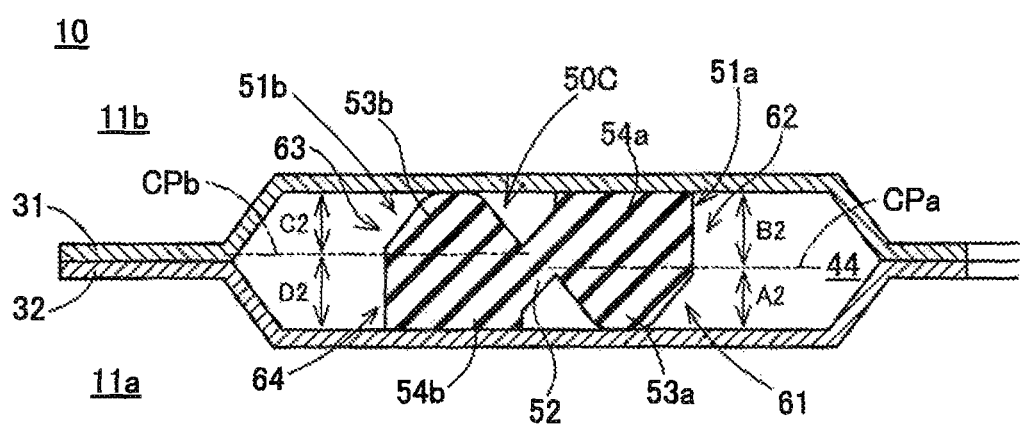
FIG. 6B is a schematic sectional view showing the state of the gasket of the third embodiment after the gasket is compressed.

Referring to FIGS. 6A and 6B, the configuration of a gasket 50C of a third embodiment will be described. FIG. 6A is a schematic sectional view showing the gasket 50C in a state before the gasket 50C is compressed. FIG. 6B is a schematic sectional view showing the gasket 50C in a state after the gasket 50C is compressed. The cutting planes of FIGS. 6A and 6B correspond to those shown in FIGS. 5A and 5B referred to in the description of the second embodiment. Like FIG. 5B, FIG. 6B shows the second separator 32 of the first fuel cell 11a and the first separator 31 of the second fuel cell 11b.

The gasket 50C of the third embodiment has a configuration similar to that of the gasket SOB of the second embodiment, except for the points described later. In the gasket 50C, compressive deformation ratios in the height direction at the upward sections 61 and 63 of the sealing parts 51a and 51b are also greater than at the downward sections 62 and 64 of the sealing parts 51a and 51b. Further, the relationships defined by the inequalities (1) and (2) described in the first embodiment are established in a state before the gasket 50C is assembled into the fuel cell stack 10 and a state after the assembling. The gasket 50C of the third embodiment is assembled into the fuel cell stack 10 described in the first embodiment (see in FIGS. 1 to 3).

In the gasket 50C, the first lip portion 53a has a cross-sectional shape increasing in width gradually toward the first base portion 54a in the cutting plane of FIG. 6A. Likewise, the second lip portion 53b has a cross-sectional shape increasing in width gradually toward the second base portion 54b in the cutting plane of FIG. 6A. This makes it unlikely that each of the lip portions 53a and 53b will be compressed in a distorted state when the gasket 50C is assembled into the fuel cell stack 10 such as a state where each of the compressed lip portions 53a and 53b collapses in a direction crossing the height direction, for example. In this way, deterioration or reduction in sealing performance resulting from distortion of the gasket 50C is reduced in the fuel cell stack 10. Each of the first lip portion 53a and the second lip portion 53b may have a cross section formed into a substantially triangular shape, for example. This makes it still less likely that the first lip portion 53a and the second lip portion 53b will be deformed by compression in distorted states.

Additionally, the gasket 50C of the third embodiment and the fuel cell stack 10 including the gasket 50C achieve the various working effects described in the third embodiment and various working effects comparable to those described in the first and second embodiments.

4. Fourth Embodiment

Figure 7A:
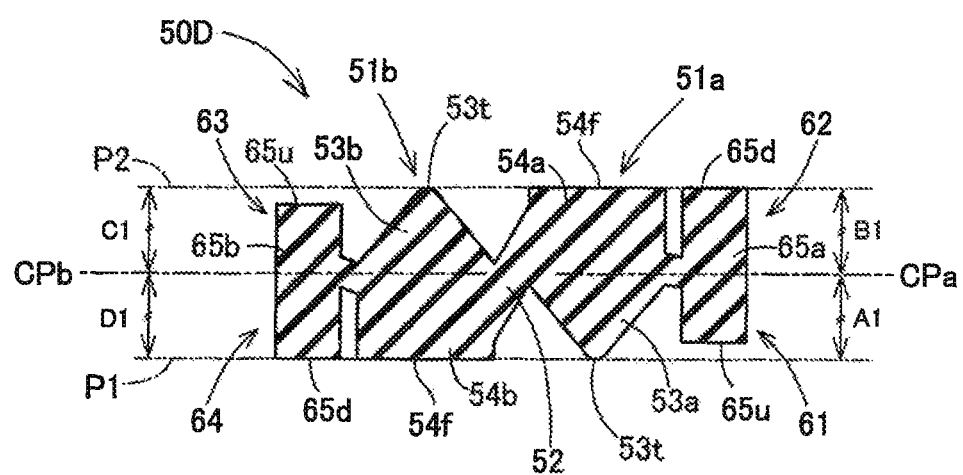
FIG. 7A is a schematic sectional view showing the state of a gasket of a fourth embodiment before the gasket is compressed.

Referring to FIGS. 7A and 7B, the configuration of a gasket 50D of a fourth embodiment will be described. FIG. 7A is a schematic sectional view showing the gasket 50D in a state before the gasket 50D is compressed. FIG. 7B is a schematic sectional view showing the gasket 50D in a state after the gasket SOD is compressed. The cutting planes of FIGS. 7A and 7B correspond to those shown in FIGS. 6A and 6B referred to in the description of the third embodiment. FIG. 7B illustrates any two gaskets 50D each caught between the first fuel cell 11a and the second fuel cell 11b and adjacent to each other the in the stacking direction SD. For the convenience of illustration in FIG. 7B, the fuel cells 11a and 11b are displaced from each other, so that the two gaskets 50D are arranged at positions displaced from each other.

The gasket 50D of the fourth embodiment has a configuration similar to that of the gasket 50C of the third embodiment, except for the points described later. In the gasket 50D, compressive deformation ratios in the height direction at the upward sections 61 and 63 of the sealing parts 51a and 51b are also higher at the upward sections 61 and 63 than at the downward sections 62 and 64 of the sealing parts 51a and 51b. Further, the relationships defined by the inequalities (1) and (2) described in the first embodiment are established in a state before the gasket 50D is assembled into the fuel cell stack 10 and a state after the assembling. The gasket 50D of the fourth embodiment is assembled into the fuel cell stack 10 described in the first embodiment (see in FIGS. 1 to 3).

The gasket 50D includes two auxiliary parts 65a and 65b (as shown in FIG. 7A). The first auxiliary part 65a is connected to the first sealing part 51a at a lateral position opposite the second sealing part 51b. The second auxiliary part 65b is connected to the second sealing part 51b at a lateral position opposite the first sealing part 51a. Each of the auxiliary parts 65a and 65b has opposite end portions in the height direction, each of which abuts on the fuel cell 11a or 11b at a position away from a corresponding one of the sealing parts 51a and 51b when the gasket 50D is assembled into the fuel cell stack 10 (as shown in FIG. 7B).

In the gasket 50D, the addition of the auxiliary parts 65a and 65b makes the gasket 50D contact each of the fuel cells 11a and 11b in a wider range (as shown in FIG. 7B). This makes it unlikely that each of the fuel cells 11a and 11b will be deformed locally only at a section where pressing force is applied from each of the sealing parts 51a and 51b. Further, the addition of the auxiliary parts 65a and 65b increases the ratio of the width of the gasket 50D to the prescribed width of the groove 44. This increase in the ratio reduces an area in the groove 44 where the position of the gasket 50D is changeable. Thus, even if the gasket 50D is unintentionally displaced from a prescribed position in the groove 44 during steps of assembling the gasket 50D into the fuel cell stack 10, the amount of this displacement will not be increased seriously. Specifically, displacement in the position of the gasket 50D in the groove 44 is reduced. Additionally, even if the adjacent fuel cells 11a and 11b are displaced from each other so the gaskets 50D adjacent to each other in the stacking direction SD are arranged at positions displaced from each other, chance of receiving pressing force applied from each of the sealing parts 51a and 51b is increased by the use of the auxiliary parts 65a and 65b of the adjacent gasket 50D. In this way, deformations of the fuel cells 11a and 11b are reduced.

When the gasket 50D is not compressed, each of the auxiliary parts 65a and 65b is lower in height than a corresponding one of the sealing parts 51a and 51b (as shown in FIG. 7A). Thus, when the gasket 50D is assembled into the fuel cell stack 10, each of the auxiliary parts 65a and 65b is allowed to be deformed by compression in the height direction to a smaller amount than a corresponding one of the sealing parts 51a and 51b. This makes it unlikely that pressure applied from the fuel cells 11a and 11b to each of the sealing parts 51a and 51b will be reduced by reaction force from each of the auxiliary parts 65a and 65b on the fuel cells 11a and 11b.

The first auxiliary part 65a has an upper surface 65u located at a lower position than the top 53t of the first lip portion 53a (as shown in FIG. 7A). Likewise, the second auxiliary part 65b has an upper surface 65u located at a lower position than the top 53t of the second lip portion 53b. Thus, when the gasket 50D is assembled into the fuel cell stack 10 (as shown in FIG. 7B), it becomes less likely that tightness of contact between each of the lip portions 53a and 53b and a corresponding one of the fuel cells 11a and 11b will be reduced by reaction force from each of the auxiliary parts 65a and 65b on the fuel cells 11a and 11b.

In the gasket 50D, the first auxiliary part 65a has a bottom surface 65d located at substantially the same height position as the bottom surface 54f of the first base portion 54a (as shown in FIG. 7A). Likewise, the second auxiliary part 65b has a bottom surface 65d located at substantially the same height position as the bottom surface 54f of the second base portion 54b. Thus, the gasket 50D is arranged in a still more stable posture. This reduces the occurrence of distortion in the gasket 50D in the fuel cell stack 10.

As described above, the gasket 50D of the fourth embodiment achieves the various working effects described in the fourth embodiment including reduction in deformations of the fuel cells 11a and 11b and arrangement of the gasket 50D in a more stable posture by the support of the auxiliary parts 65a and 65b. Additionally, the gasket 50D of the fourth embodiment and the fuel cell stack 10 including the gasket 50D achieve various working effects comparable to those described in the first, second, and third embodiments.

5. Fifth Embodiment

Figure 8A:
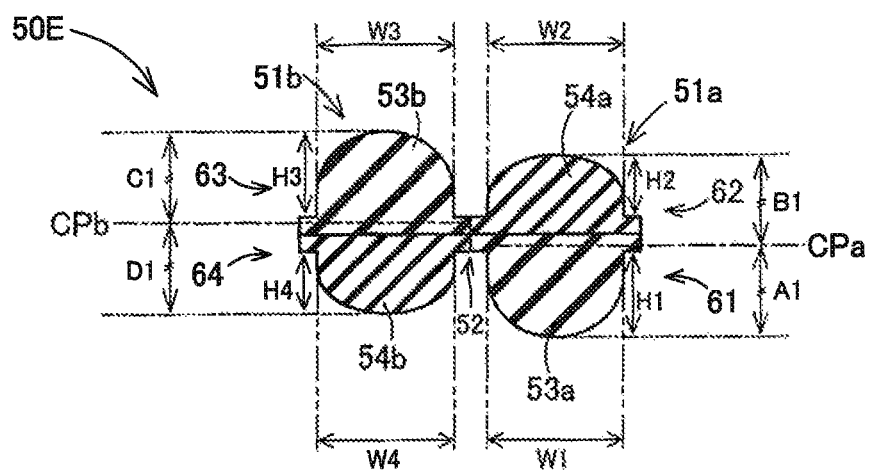
FIG. 8A is a schematic sectional view showing the state of a gasket of a fifth embodiment before the gasket is compressed.
Figure 8B:
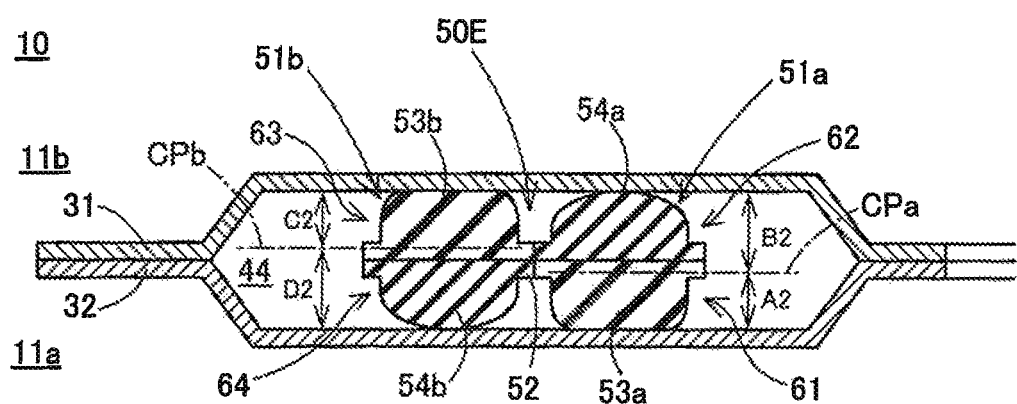
FIG. 8E is a schematic sectional view showing the state of the gasket of the fifth embodiment after the gasket is compressed.

Referring to FIGS. 8A and 8B, the configuration of a gasket 50E of a fifth embodiment will be described. FIG. 8A is a schematic sectional view showing the gasket 50E in a state before the gasket 50E is compressed. FIG. 8B is a schematic sectional view showing the gasket 50E in a state after the gasket 50E is compressed. The cutting planes of FIGS. 8A and 8B correspond to those shown in FIGS. 4A and 4B referred to in the description of the first embodiment. Like FIG. 4B, FIG. 8B shows the second separator 32 of the first fuel cell 11a and the first separator 31 of the second fuel cell 11b.

The gasket 50E of the fifth embodiment has a configuration similar to that of the gasket 50A described in the first embodiment, except for the points described below. The gasket 50E is assembled into the fuel cell stack 10 described in the first embodiment (see in FIGS. 1 to 3).

In the gasket 50E, the first sealing part upward section 61 is formed of a member having a lower modulus of elasticity than a member forming the first sealing part downward section 62. Thus, in the first sealing part 51a, a modulus of elasticity is lower at the first lip portion 53a than at the first base portion 54a. Further, the second sealing part upward section 63 is formed of a member having a lower modulus of elasticity than a member forming the second sealing part downward section 64. Thus, in the second sealing part 51b, a modulus of elasticity is lower at the second lip portion 53b than at the second base portion 54b.

The gasket 50E is formed by a multi-color molding method, for example. To form the gasket 50E by a two-color molding method, the following steps are applicable, for example. First, two types of resin materials having different moduli of elasticity are poured into a first mold to form the first sealing part upward section 61 and the second sealing part downward section 64. Next, the resultant first sealing part upward section 61 and second sealing part downward section 64 are placed in a second mold and two types of resin materials having different moduli of elasticity are poured into the second mold, thereby forming the first sealing part downward section 62 and the second sealing part upward section 63. Thus, in the resultant gasket 50E, a modulus of elasticity differs between the upward sections 61 and 63 and the downward sections 62 and 64.

In the first sealing part 51a of the gasket 50E, a modulus of elasticity is lower at the first sealing part upward section 61 than at the first sealing part downward section 62. Thus, a compressive deformation ratio in the height direction becomes higher at the first sealing part upward section 61 than at the first sealing part downward section 62. In the second sealing part 51b, a modulus of elasticity is lower at the second sealing part upward section 63 than at the second sealing part downward section 64. Thus, a compressive deformation ratio in the height direction becomes higher at the second sealing part upward section 63 than at the second sealing part downward section 64. Further, in the gasket 50E, the relationships defined by the inequalities (1) and (2) described in the first embodiment are established in a state before the gasket 50E is assembled into the fuel cell stack 10 and a state after the assembling. Thus, like in the gasket 50A of the first embodiment, each of the upward sections 61 and 63 contacts a corresponding one of the fuel cells 11*a* and 11*b* more tightly. Further, the amount of deformation by compression of each of the sealing parts 51*a* and 51*b* in the height direction will not be increased seriously from a state before compression to a state after the compression.

In the gasket 50E, each of the first lip portion 53*a* and the second lip portion 53*b* is formed as a protruded portion having a cross section of a substantially semispherical shape protruding upwardly in the cutting plane of FIG. 8A. This makes it unlikely that the first lip portion 53*a* and the second lip portion 53*b* will be compressed in distorted states.

In the fifth embodiment, in the cutting plane of FIG. 8A, the maximum width W1 of the first lip portion 53*a* is equal to the maximum width W2 of the first base portion 54*a*. Further, the maximum width W3 of the second lip portion 53*b* is equal to the maximum width W4 of the second base portion 54*b*. Alternatively, the maximum width W1 of the first lip portion 53*a* may differ from the maximum width W2 of the first base portion 54*a*. Further, the maximum width W3 of the second lip portion 53*b* may differ from the maximum width W4 of the second base portion 54*b*.

In the fifth embodiment, in a state before the gasket 50E is compressed, the height H1 of the first lip portion 53*a* is greater than the height H2 of the first base portion 54*a*. Further, the height H3 of the second lip portion 53*b* is greater than the height H4 of the second base portion 54*b* (FIG. 8A). Alternatively, the height H1 of the first lip portion 53*a* may be equal to the height H2 of the first base portion 54*a*. Further, the height H3 of the second lip portion 53*b* may be equal to the height H4 of the second base portion 54*b*.

As described above, in the gasket 50E of the fifth embodiment, the upward sections 61 and 63 are formed of a member having a lower modulus of elasticity than a member forming the downward sections 62 and 64. By doing so, the gasket 50E is allowed to achieve various working effects comparable to those achieved by the gasket 50A of the first embodiment. Additionally, the gasket 50E of the fifth embodiment and the fuel cell stack 10 including the gasket 50E achieve the various working effects described in the fifth embodiment, and the various working effects described in the first, second, third, and fourth embodiments.

6. Modifications

The following modifications described as examples are applicable to the various configurations in each of the above-described embodiments. Each of the following modifications is regarded as an example of embodiment of this disclosure as same as the above embodiments.

6-1. First Modification

In the above-described embodiments, the first separator 31 is an anode-side separator and the second separator 32 is a cathode-side separator. However, the first separator 31 may be a cathode-side separator and the second separator 32 may be an anode-side separator. Specifically, the configuration including the cathode-side seal line SL for the first fuel cell 11*a* formed by the first sealing part 51*a* and the anode-side seal line SL for the second fuel cell 11*b* formed by the second sealing part 51*b* may be replaced by a configuration including the anode-side seal line SL for the first fuel cell 11*a* formed by the first sealing part 51*a* and the cathode-side seal line SL for the second fuel cell 11*b* formed by the second sealing part 51*b*.

6-2. Second Modification

In each of the above-described embodiments, the first sealing part 51*a* has a shape formed by flipping the second sealing part 51*b* from top to bottom. However, the first sealing part 51*a* may have a shape different from the shape formed by flipping the second sealing part 51*b* from top to bottom. For example, the height H1 of the first lip portion 53*a* and the height H3 of the second lip portion 53*b* may differ from each other. Alternatively, the maximum width W1 of the first lip portion 53*a* and the maximum width W3 of the second lip portion 53*b* may differ from each other. Alternatively, in a cutting plane vertical to the seal line SL, the cross-sectional shape of the first base portion 54*a* and that of the second base portion 54*b* may differ from each other. Still alternatively, the first lip portion 53*a* may have the shape described in the first embodiment and the second lip portion 53*b* may have the shape described in the third embodiment.

6-3. Third Modification

In each of the above-described embodiments, the first sealing part 51*a* and the second sealing part 51*b* are connected by the connecting part 52. However, the connecting part 52 is omissible. Without the connecting part 52, the first sealing part 51*a* and the second sealing part 51*b* may be configured to be capable of being separated from each other.

6-4. Fourth Modification

In the above-described second embodiment, the gasket 50B has the first configuration and the second configuration. In the first configuration, the top 53*t* of the first lip portion 53*a* and the bottom surface 54*f* of the second base portion 54*b* are located on the first virtual plane P1. In the second configuration, the top 53*t* of the second lip portion 53*b* and the bottom surface 54*f* of the first base portion 54*a* are located on the second virtual plane P2. However, the gasket 50B may include only the first configuration or only the second configuration. In either case, the probability of assembling of the gasket 50B in a distorted state is reduced by placing the gasket 50B on the fuel cell 11 while pointing the gasket 50B downwardly in the direction of gravitational force at a surface capable of extending substantially horizontally to a surface for placement of the gasket 50B during the steps of assembling the gasket 50B.

6-5. Fifth Modification

In the fourth embodiment, the gasket 50D includes the two auxiliary parts 65*a* and 65*b*. However, the gasket 50D may include only one of the two auxiliary parts 65*a* and 65*b*. The auxiliary parts 65*a* and 65*b* are applicable to the gaskets 50A to 50C and 50E of the other embodiments.

6-6. Sixth Modification

Like in the fifth embodiment, in the above-described first, second, third, and fourth embodiments, the upward sections 61 and 63 may be made of a material having a lower modulus of elasticity than a material forming the lower sections 62 and 64. In this case, not only the shapes of the upward sections 61 and 63 but also the moduli of elasticity of the materials are usable for making adjustment in order for the upward sections 61 and 63 to have higher compressive deformation ratios in the height direction than the downward sections 62 and 64. This increases a degree of flexibility in designing the shapes of the upward sections 61 and 63.

7. Other Aspects

The disclosure is not limited to the above-described embodiments, examples, or modifications but is feasible in the form of various configurations within a range not deviating from the substance of this present disclosure. For example, technical features in the embodiments, those in the examples, or those in the modifications corresponding to those in each of the aspects described in SUMMARY can be replaced or combined, where appropriate, with the intention of solving some or all of the aforementioned problems or achieving some or all of the aforementioned effects. Not only technical features described as not being absolute necessities but also technical features not described as being absolute necessities in this specification may be deleted, where appropriate. The present disclosure may be implemented by aspects described below.

(1) According to one aspect of this present disclosure, a gasket being caught between a first fuel cell and a second fuel cell of multiple stacked fuel cells included in a fuel cell stack is provided. The gasket being compressed in a height direction to seal a sealed area in the fuel cell stack. The gasket of this aspect comprises: a first sealing part surrounding the sealed area; and a second sealing part surrounding the sealed area and being provided external to an area surrounded by the first sealing part. When a compressive deformation ratio is defined as a ratio of a deformation amount in the height direction to pressure applied to the gasket in the height direction; in the first sealing part, the compressive deformation ratio at a section to be arranged on the first fuel cell side is greater than the compressive deformation ratio at a section to be arranged on the second fuel cell side; and in the second sealing part, the compressive deformation ratio at a section to be arranged on the second fuel cell side is greater than the compressive deformation ratio at a section to be arranged on the first fuel cell side.

In the gasket of this aspect, sealing performance in a place closer to the first fuel cell is increased at the section of the first sealing part of a high compressive deformation ratio. Sealing performance in a place closer to the second fuel cell is increased at the section of the second sealing part of a high compressive deformation ratio. Further, the provision of the section of a low compressive deformation ratio in each sealing part allows reduction in the amount of deformation by compression of each sealing part as a whole in the height direction. This allows reduction in the occurrence of distortion in each sealing part. As described above, the provision of the first sealing part for sealing the place closer to the first fuel cell and the second sealing part for sealing the place closer to the second fuel cell allows reduction in distortion in the gasket as a whole while increasing sealing performance by the gasket as a whole. Further, durability of the gasket is increased.

(2) In the gasket of the above-described aspect, the first sealing part may include a first lip portion and a first base portion. The first lip portion protrudes in the height direction and abuts on the first fuel cell to form a seal line surrounding the sealed area. The first base portion is located downwardly from the first lip portion and abuts on the second fuel cell. The second sealing part may include a second lip portion and a second base portion. The second lip portion protrudes in the height direction and abuts on the second fuel cell to form a seal line surrounding the sealed area. The second base portion is located downwardly from the second lip portion and abuts on the first fuel cell.

In the gasket of this aspect, while the first lip portion and the second lip portion are usable for increasing sealing performance by the gasket, the first base portion and the second base portion are usable for arranging the gasket in a more stable posture.

(3) The gasket of the above-described aspect may comprise at least one of a first configuration and a second configuration. In the first configuration, a top of the first lip portion and a lower end of the second base portion are both located on a first virtual plane vertical to the height direction in a state before the gasket is compressed. In the second configuration, a top of the second lip portion and a lower end of the first base portion are both located on a second virtual plane vertical to the height direction in the state before the gasket is compressed.

The gasket of this aspect facilitates arrangement such that the height direction of the gasket and a direction in which the gasket is compressed agree with each other. Thus, the gasket is assembled into the fuel cell stack with a higher degree of accuracy, making it unlikely that the gasket will be assembled in a distorted state into the fuel cell stack.

(4) In the gasket of the above-described aspect, in a state before the gasket is compressed, the first lip portion may have a shape increasing in width gradually toward the first base portion in a cutting plane vertical to the seal line. In the state before the gasket is compressed, the second lip portion may have a shape increasing in width gradually toward the second base portion in a cutting plane vertical to the seal line.

The gasket of this aspect makes it unlikely that the first lip portion and the second lip portion will be compressed in distorted states when the gasket is assembled into the fuel cell stack.

(5) In the gasket of the above-described aspect, the first sealing part may have a substantially flat surface at an end of the first sealing part closer to the second fuel cell in the height direction. The substantially flat surface contacts the second fuel cell and is vertical to the height direction. The second sealing part may have a substantially flat surface at an end of the second sealing part closer to the first fuel cell in the height direction. The substantially flat surface contacts the first fuel cell and is vertical to the height direction.

The gasket of this aspect is arranged in a more stable posture.

(6) In the gasket of the above-described aspect, the section to be arranged on the first fuel cell side of the first sealing part may be formed of a member having a lower modulus of elasticity than a member forming the section to be arranged on the second fuel cell side of the first sealing part. The section to be arranged on the second fuel cell side of the second sealing part may be formed of a member having a lower modulus of elasticity than a member forming the section to be arranged on the first fuel cell side of the second sealing part.

In the gasket of this aspect, adjustment of the compressive deformation ratio is facilitated by adjusting the moduli of elasticity of the members.

(7) The gasket of the above-described aspect may comprise a connecting part connecting the first sealing part and the second sealing part.

In the gasket of this aspect, the first sealing part and the second sealing part support each other through the connecting part, the gasket is arranged in a more stable posture. Further, the first sealing part and the second sealing part are handled integrally during steps of assembling the gasket into the fuel cell stack. Thus, the gasket is handled more easily to increase efficiency.

(8) The gasket of the above-described aspect may comprise an auxiliary part, wherein the auxiliary part contacts, when the gasket is assembled into the fuel cell stack, the first fuel cell and the second fuel cell at a position away from the first sealing part and the second sealing part and deforms in a state where amount of compressive deformation in the height direction is smaller than the first sealing part and the second sealing part.

In the gasket of this aspect, the provision of the auxiliary part makes the gasket contact the fuel cell in a wider range. This makes it unlikely that the fuel cell will be deformed locally by pressing force applied from the gasket. Further, the auxiliary part also acts to arrange the gasket in a still more stable posture.

(9) According to another aspect of the present disclosure, a fuel cell stack comprising the gasket described in any of the above-described aspects is provided.

In the fuel cell stack of this aspect, performance of sealing a fluid is increased. Further, deterioration of the sealing performance is reduced.

Not all the multiple components included in each of the above-described aspects of the present disclosure are essential, but some of these components may appropriately be changed, deleted, or replaced with other components, or some of the limitations may be deleted, in order to solve some or all of the problems described above or in order to achieve some or all of the advantageous effects described in this specification. In order to solve some or all of the above-described problems or in order to achieve some or all of the advantageous effects described in this specification, some or all of the technical features included in one of the above-described aspects of the present disclosure may be combined with some or all of the technical features included in a different one of the above-described aspects of the present disclosure to provide still another independent aspect of the present disclosure.

The present disclosure is feasible in various aspects other than the gasket and the fuel cell stack. These aspects include a method of manufacturing the gasket, a method of manufacturing the fuel cell stack, and a sealing structure in the fuel cell stack, for example.

What is claimed is:

1. A gasket configured to be caught between a first fuel cell and a second fuel cell, the gasket being configured to surround a sealed area and to be compressed in a height direction between the first fuel cell and the second fuel cell to seal the sealed area, the gasket comprising:
a first sealing part configured to surround the sealed area; and
a second sealing part configured to surround the sealed area and the first sealing part, wherein,
in the first sealing part, a first compressive deformation ratio at a first section configured to be arranged on a side of the gasket facing the first fuel cell is greater than a second compressive deformation ratio at a second section configured to be arranged on a side of the gasket facing the second fuel cell,
in the second sealing part, a third compressive deformation ratio at a third section configured to be arranged on the side of the gasket facing the second fuel cell is greater than a fourth compressive deformation ratio at a fourth section configured to be arranged on the side of the gasket facing the first fuel cell, and
each of the first, second, third, and fourth compressive deformation ratios is defined as a ratio of a deformation amount in the height direction of the first, second, third, and fourth sections, respectively, to pressure applied to the first, second, third, and fourth sections, respectively, in the height direction.

2. The gasket in accordance with claim 1, wherein
the first section of the first sealing part includes a first lip portion and the second section of the first sealing part includes a first base portion, the first lip portion being configured to protrude in the height direction and to abut on the first fuel cell to seal the sealed area, the first base portion being configured to be located downwardly from the first lip portion and to abut on the second fuel cell, and
the third section of the second sealing part includes a second base portion and the fourth section of the second sealing part includes a second lip portion, the second lip portion being configured to protrude in the height direction and to abut on the second fuel cell to seal the sealed area, the second base portion being configured to be located downwardly from the second lip portion and to abut on the first fuel cell.

3. The gasket in accordance with claim 2, the gasket being configured to be arranged in at least one of a first configuration and a second configuration, wherein
in the first configuration, a top of the first lip portion and a lower end of the second base portion are both located on a first virtual plane vertical to the height direction in a state before the gasket is compressed, and
in the second configuration, a top of the second lip portion and a lower end of the first base portion are both located on a second virtual plane vertical to the height direction in the state before the gasket is compressed.

4. The gasket in accordance with claim 2, wherein
in a state before the gasket is compressed, the first lip portion has a shape increasing in width gradually toward the first base portion in a cutting plane vertical to a lengthening direction of the first sealing part, and
in the state before the gasket is compressed, the second lip portion has a shape increasing in width gradually toward the second base portion in a cutting plane vertical to a lengthening direction of the second sealing part.

5. The gasket in accordance with claim 1, wherein
the first sealing part has a first substantially flat surface at an end of the first sealing part that is configured to be positioned closer to the second fuel cell in the height direction, the first substantially flat surface being configured to contact the second fuel cell and to be vertical to the height direction, and
the second sealing part has a second substantially flat surface at an end of the second sealing part that is configured to be positioned closer to the first fuel cell in the height direction, the second substantially flat surface being configured to contact the first fuel cell and to be vertical to the height direction.

6. The gasket in accordance with claim 1, wherein
the first section of the first sealing part is formed of a first member having a lower modulus of elasticity than a second member forming the second section of the first sealing part, and
the third section of the second sealing part is formed of a third member having a lower modulus of elasticity than a fourth member forming the fourth section of the second sealing part.

7. The gasket in accordance with claim 1, further comprising a connecting part connecting the first sealing part and the second sealing part.

8. The gasket in accordance with claim 1, further comprising an auxiliary part, wherein, when the gasket is caught between the first fuel cell and the second fuel cell, the auxiliary part is configured:
- to contact the first fuel cell and the second fuel cell at a position away from the first sealing part and the second sealing part and
- to be deformed in a state where an amount of compressive deformation of the auxiliary part in the height direction is smaller than amounts of compressive deformation of the first sealing part and the second sealing part in the height direction.

9. A fuel cell stack with multiple stacked fuel cells, the fuel cell stack comprising the gasket in accordance with claim 1.

\* \* \* \* \*